United States Patent [19]
Sias

[11] 4,109,010
[45] Aug. 22, 1978

[54] ANTI-MICROBIAL COMPOSITIONS

[75] Inventor: Roy C. Sias, Ponca City, Okla.

[73] Assignee: Continental Oil Company, Ponca City, Okla.

[21] Appl. No.: 442,948

[22] Filed: Feb. 15, 1974

[51] Int. Cl.[2] .......... A01N 9/00
[52] U.S. Cl. .......... 424/289; 252/106; 252/107; 252/DIG. 16
[58] Field of Search .......... 424/289; 252/107

[56] References Cited

U.S. PATENT DOCUMENTS 2,121,485 6/1938 McAllister et al. .......... 424/289

OTHER PUBLICATIONS

Chemical Abstracts, vol. 59 (1963), p. 6932b.

*Primary Examiner*—V. D. Turner
*Attorney, Agent, or Firm*—Cortlan R. Schupbach, Jr.

[57] ABSTRACT

An anti-microbial composition consisting of ammoniated zinc compounds optionally formulated into surfactant formulations and toilet bars is presented.

2 Claims, No Drawings

ANTI-MICROBIAL COMPOSITIONS

The present invention relates to the preparation and use of anti-microbial compositions.

The present invention further relates to ammoniated zinc sulfonates.

The present invention further relates to surfactant formulations and toilet bars containing ammoniated zinc sulfonates.

In the preparation and use of detersive materials, it is oftentimes desirable to impart anti-microbial activity to such materials. Since most detersive materials on the market today are biodegradable, it is desirable that the anti-microbial activity be imparted to the detersive materials in such a manner that the biodegradability of the detersive materials in sewage treatment facilities is not inhibited.

Numerous anti-microbial compositions have been used to impart anti-microbial activity to surfactant formulations and the like. Some such materials are phenolic materials, quaternary ammonium compounds, and iodoforms. An article describing some such materials appears in *Detergent Age*, January, 1968, at page 84. Since there are many uses for anti-microbial surfactant compositions, a continuing effort has been devoted to the development of new compositions which are effective in cleaning materials, surfactant formulations, and the like.

It is an objective of the present invention to provide an anti-microbial composition.

It is a further objective of the present invention to provide anti-microbial surfactant formulations.

It is a further objective of the present invention to provide anti-microbial surfactant formulations wherein such anti-microbial compounds are blended with surfactant materials to produce surfactant formulations having anti-microbial activity.

It is a further objective of the present invention to provide a method whereby anti-microbial activity is imparted to toilet bars.

It has now been found that the objectives of the present invention are achieved by the use of an anti-microbial composition consisting of ammoniated zinc compounds selected from the group consisting of ammoniated zinc salts of alkylaryl sulfonic acids, ammoniated zinc salts of benzene sulfonic acid, ammoniated zinc salts of alkyl hydroxy sulfonic acids, ammoniated zinc salts of olefin sulfonic acids, ammoniated zinc salts of alkyl sulfates, ammoniated zinc salts of diphenylalkane sulfonic acids, and combinations thereof in the preparation of anti-microbial formulations, such as solutions of the ammoniated zinc compounds in aqueous solution, formulations of the ammoniated zinc compounds in surfactant formulations, formulations of the ammoniated zinc compositions in detergent bars, and the like.

The ammoniated zinc compounds suitable as anti-microbial compositions are selected from the group consisting of:

a. ammoniated zinc salts of alkylaryl sulfonic acids wherein the alkyl portion of the acids contains from about 1 to about 16 carbon atoms and wherein the salts contain an average of about 0.5 to about 6.0 molecules of ammonia per molecule of zinc;
b. ammoniated zinc salts of benzene sulfonic acid containing an average of from about 0.5 to about 6.0 molecules of ammonia per molecule of zinc;

c. ammoniated zinc salts of alkyl hydroxy sulfonic acids wherein the alkyl portion contains from about 12 to about 20 carbon atoms and wherein the salts contain an average of from about 0.5 to about 6.0 molecules of ammonia per molecule of zinc;
d. ammoniated zinc salts of olefin sulfonic acids wherein the olefin portion contains from about 12 to about 20 carbon atoms and wherein the salts contain an average of from about 0.5 to about 6.0 molecules of ammonia per molecule of zinc;
e. ammoniated zinc salts of alkyl sulfates wherein the alkyl portion contains from about 10 to about 16 carbon atoms and wherein the salts contain an average of from about 0.5 to about 6.0 molecules of ammonia per molecule of zinc;
f. ammoniated zinc salts of diphenylalkane sulfonic acids wherein the alkyl portion contains a total of from about 2 to about 16 carbon atoms and wherein the salts contain an average of from about 0.5 to about 6.0 molecules of ammonia per molecule of zinc; and
g. combinations thereof.

The materials may be used in any desired combination, and the lighter materials are preferred generally because of their increased solubility in water. It has also been found desirable that the salts contain an average of about 1.5 to about 3.0 molecules of ammonia per molecule of zinc. In the alkylaryl and diphenylalkane sulfonic acids, the sulfonic acid group is positioned on the aryl portion of the molecule.

In one use of the anti-microbial compositions of the present invention, anti-microbial formulations are prepared by dispersing from about 0.5 to about 50 weight percent of an ammoniated zinc compound or a combination of ammoniated zinc compounds selected from the group described above in water containing from about 1 to about 30 weight percent of an alcohol selected from the group consisting of alkanols and dihydroxyalkanols containing from about 2 to about 4 carbon atoms and the like to provide a formulation which contains from about 98.5 to about 20 and preferably about 75 to about 40 weight percent water. Some suitable alcohols are ethanol, isopropanol, propanol, butanol, isobutanol, and tertiary butanol. Ethylene glycol is an example of a suitable dihydroxyalkanol.

The formulations described are useful in removing microbial growth from surfaces generally. The articles to be disinfected may be immersed in the solution, washed with the solution, sprayed with the solution, and the like.

In many instances, it will be desirable to include a hydrotrope in the formulation in order to obtain solutions containing a higher concentration of the anti-microbial composition. The hydrotrope is typically present in an amount from about 1 to about 10 weight percent, based on the formulation weight. Some suitable hydrotrope materials are sodium, potassium, and ammonium xylene sulfonate; sodium, potassium, and ammonium toluene sulfonate; combinations thereof; and the like.

The formulations optionally also contain from about 5 to about 50 weight percent of a detersive material selected from the group consisting of linear alkyl benzene sulfonates containing from about 8 to about 16 carbon atoms in the alkyl portion; olefin sulfonates containing from about 12 to about 20 carbon atoms; fatty acid soaps containing from about 12 to about 18 carbon atoms; alkyl ethoxy ethanol nonionic surfactants containing from about 8 to about 18 carbon atoms and from about 5 to about 25 ethoxylate groups; alcohol sulfates containing from about 12 to about 16 carbon atoms; ethoxylated alcohol sulfates containing from about 10 to about 16 carbon atoms and from about 2 to about 5 ethoxylate groups; and combinations thereof. The cationic portion of such detersive materials is desirably selected from the group consisting of sodium, potassium and ammonium. Such formulations are useful in disinfecting surfaces as well as cleaning surfaces since the surfactant materials are effective cleaners. The formulation containing the anti-microbial composition and the surfactant is thus effective in both cleaning and disinfecting surfaces.

In preferred formulations, the detersive material is present in an amount equal to about 10 to about 40 weight percent based on the weight of the formulation and is selected from the group consisting of linear alkyl benzene sulfonates containing from about 8 to about 16 carbon atoms in the alkyl group, olefin sulfonates containing from about 12 to about 20 carbon atoms, alkyl ethoxy ethanol nonionic surfactants containing from about 8 to about 18 carbon atoms, and from about 5 to about 25 ethoxylate groups, ethoxylated alcohol sulfates containing from about 10 to about 16 carbon atoms and from about 2 to about 5 ethoxylate groups, and combinations thereof. It is desirable that the anti-microbial composition be present in the formulation in an amount equal to from about 10 to about 50 weight percent based on the weight of the detersive material, i.e., from about 1 to about 20 weight percent based on the weight of the formulation.

The surfactant materials described herein are well known to those skilled in the art and need not be described further. The preparation of olefin sulfonates is shown in U.S. Pat. No. 3,409,637, issued Nov. 5, 1968, to Eccles et al., which is hereby incorporated by reference. Detersive materials containing fatty acid materials are shown in U.S. Pat. No. 3,640,882, issued Feb. 8, 1972, to Groves et al., which is hereby incorporated by reference. Alkyl ethoxy ethanol nonionic surfactants are described in U.S. Pat. No. 3,539,519, issued Nov. 10, 1970, to Weimer. The disclosure therein is hereby incorporated by reference. Some detergent bar formulations containing the materials described above are shown in U.S. Pat. No. 3,607,761, issued Sept. 21, 1971, to Feighner et al. The disclosure therein is hereby incorporated by reference.

The anti-microbial compositions of the present invention are also effective in powdered surfactant formulations. Such formulations contain from about 5 to about 25 weight percent of a detersive material selected from the group consisting of linear alkyl benzene sulfonates containing from about 8 to about 16 carbon atoms in the alkyl group, olefin sulfonates containing from about 12 to about 20 carbon atoms, fatty acid soaps containing from about 12 to about 18 carbon atoms, alkyl ethoxyl ethanol nonionic surfactants containing from about 8 to about 18 carbon atoms and from about 5 to about 25 ethoxylate groups, alcohol sulfates containing from about 12 to about 16 carbon atoms, ethoxylated alcohol sulfates containing from about 10 to about 16 carbon atoms and from about 2 to about 5 ethoxylate groups and combinations thereof. Desirably, the cationic portion of such detersive materials is selected from the group consisting of sodium, potassium, ammonium, and the like. From about 10 to about 75 weight percent of the formulation is typically a builder, such as sodium tripolyphosphate, nitrilotriacetic acid, sodium carbonate, sodium silicate, sodium citrate, and the like. From about 10 to about 50 weight percent of the formulation is typically sodium sulfate, and from 0.5 to about 12.5 weight percent of the formulation consists of the ammoniated zinc compounds described hereinbefore.

Anti-microbial toilet bars containing the anti-microbial compounds of the present invention are also desirable for their disinfectant and cleansing properties. Toilet bars are formulated from materials well known to the art, such as fatty acid soaps, detergents, and the like. Desirably, the bar contains from 10 to about 50 weight percent of the anti-microbial compound, based on the surfactant content of the toilet bar. The formulation of such toilet bars is well known to those skilled in the art and need not be discussed further.

Of the ammoniated zinc sulfonate compounds discussed hereinbefore, ammoniated zinc salts of straight chain alkylaryl sulfonic acids wherein the alkyl portion of the acid contains from about 1 to about 16 carbon atoms are preferred for general usage.

The ammoniated zinc compounds as such are detersive materials which produce no undesirable side effects in the detersive materials with which they are formulated. Accordingly, it is seen that the addition of such materials, in addition to enhancing the surfactant activity of the formulations to which they are added, imparts desirable anti-microbial properties to such formulations.

The ammoniated zinc salts of the compounds described hereinbefore can be prepared by conventional methods, such as neutralizing the acids with oxides, hydroxides, or alkoxides containing the desired zinc cation. The preparation of the ammoniated complex of the zinc sulfonates or zinc sulfates can be achieved by treating the zinc salts with anhydrous ammonia or aqueous ammonium hydroxide. The zinc salts oftentimes contain small amounts (i.e., less than 5 percent) of ammonium sulfate, free oil and the like. Such materials are present as the result of unsulfonated or unsulfated material, unreacted sulfuric acid in the sulfuric or sulfonic acid mixture neutralized and the like. Such materials in small quantities do not adversely affect the properties of the ammoniated zinc compounds produced. Preferably, anhydrous ammonia is used. The zinc salt is treated with the anhydrous ammonia to produce a product containing from about 0.5 to about 6.0 moles of ammonia per mole of zinc. Preferably, from about 1.5 to about 3.0 moles of ammonia per mole of zinc is used. Desirably, the ammoniated zinc compounds are then mixed with detersive materials in an amount equal to from about 1 to about 50 weight percent, based on the weight of the detersive material. Most desirably, from about 20 to about 30 weight percent is used.

Having thus described the invention, it is pointed out that the foregoing description of preferred embodiments is illustrative rather than limiting in nature, and many variations and modifications are possible within the scope of the present invention.

EXAMPLE 1

Two hundred grams of an alkylaryl sulfonic acid having an average equivalent weight of 318 (approximately 97 percent active*), 24.7 grams of zinc oxide, 200 milliliters of methyl CELLOSOLVE,** and 20 milliliters of water were charged to a round bottom flask and refluxed for 1.5 hours with mechanical agitation. The water was then removed from the reaction mass by adding methyl CELLOSOLVE and distilling overhead a total of about 250 milliliters of methyl CELLOSOLVE. The reaction mixture was cooled to about 50° C and blown with about 30 grams of anhydrous ammonia over a period of 30 minutes. Volatiles were then taken overhead to a temperature of 150° C; the product was then stripped with nitrogen gas for 15 minutes, placed in a shallow pan, and dried in a vacuum oven for 6 hours at 150° C under house vacuum. The product contained 8.4 weight percent zinc and 4.73 weight percent nitrogen.

*The alkylaryl sulfonic acid was about 97 percent pure with about 3 weight percent of the mixture comprising about 2 percent unreacted alkylaryl materials and about 1 percent unreacted sulfuric acid. **Registered trademark of Union Carbide and Carbon Corporation for 2-methoxyethanol.

The ammoniated zinc sulfonate so prepared was formulated into toilet bars. The bars contained a mixture of 80 percent tallow soap with 20 percent cocoa soap milled into bars. The formulated bars contained 25 weight percent ammoniated zinc sulfonate with the balance being the blend of tallow and cocoa soaps. The formulated toilet bars were tested for anti-microbial activity. The bars containing the ammoniated zinc sulfonate (AZS) were dispersed in water to produce a solution containing the AZS in the concentration shown in Table I under "Formulated AZS." Comparative tests were run using dispersions of similar soap bars containing no AZS with hexachlorophene being added to the dispersions in the quantities shown in Table I under "Formulated Hexachlorophene." Four bacteria strains having resistances varying from low to high were used in the tests. No problems were encountered in processing the ammoniated zinc sulfonate containing detergent bars, although it was noted that the bars were somewhat tackier than bars containing only the tallow/cocoa soap blend. A slight ammonia odor was noted. In tests of the formulated bars, the following results were obtained:

TABLE I

| Organism | Typical Resistance to Anti-microbials |
|---|---|
| *Staphylococcus aureus* | Low |
| *Escherichia coli* | Moderate |
| *Salmonella typhosa* | Moderate |
| *Pseudomonas fluorescens* | High (similar to mold or fungi) |

| | CONCENTRATION OF AZS (mg/l) REQUIRED TO KILL | |
|---|---|---|
| | AZS Alone | Formulated AZS |
| *Staphylococcus aureus* | 50 | 750 |
| *Escherichia coli* | 250 | 6,000 |
| *Salmonella typhosa* | 750 | 4,000 |
| *Pseudomonas fluorescens* | >6,000 | >12,000 |

| | CONCENTRATION OF HEXACHLOROPHENE (mg/l) REQUIRED TO KILL | |
|---|---|---|
| | Hexachlorophene Alone | Formulated Hexachlorophene |
| *Staphylococcus aureus* | <100 | <100 |
| *Escherichia coli* | 1,500 | <100 |
| *Salmonella typhosa* | 250 | <100 |
| *Pseudomonas fluorescens* | 3,000 | <100 |

It is clearly seen that the ammoniated zinc sulfonate is effective in killing microorganisms, thereby disinfecting surfaces cleaned with formulations containing the ammoniated zinc sulfonate. It is noted that the ammoniated zinc salts are somewhat less effective when present in the same quantities than hexachlorophene; however, it is noted hexachlorophene has recently been banned in a number of such applications, and it is highly desirable that an effective anti-microbial composition be available to replace hexachlorophene in such formulations.

EXAMPLE 2

Three hundred grams of an alkylaryl sulfonic acid having an equivalent weight of 320 (approximately 95 percent active*) was charged to a reaction vessel. Five hundred grams of methyl CELLOSOLVE was charged, followed by 36.6 grams of zinc oxide and 30 milliliters of water. The reaction was carried to reflux and continued for about 1.5 hours. The volatiles were then taken overhead at a temperature of 145° C, and the reaction vessel cooled to a temperature below 120° C. Five hundred grams of ethylene glycol was charged. The solution was then blown with anhydrous ammonia for 35 minutes at about 800 milliliters per minute. The reaction vessel was then heated to 150° C and stripped with ammonia gas for about 30 minutes. The product weighed 781 grams and contained 3.73 percent zinc, 1.77 percent nitrogen, 37.1 percent active, and had a mole ratio of 2.2 moles of nitrogen per mole of zinc.

*The alkylaryl sulfonic acid was about 95 percent pure with about 5 weight percent of the mixture comprising about 3 percent unreacted alkylaryl material and about 2 percent unreacted sulfuric acid.

It is believed that the foregoing examples clearly show that the preparation of the ammoniated zinc salts of the present invention is readily achieved by the methods set forth and that, surprisingly and unexpectedly, such ammoniated zinc salts are effective as anti-microbial compositions for use in conjunction with formulations containing surfactants and the like.

Having thus described the invention, I claim:

1. An anti-microbial formulation containing from about 0.5 to about 50 weight percent of an ammoniated zinc compound selected from the group consisting of
   a. ammoniated zinc salts of alkylaryl sulfonic acids wherein the alkyl portion contains from 1 to 16 carbon atoms and wherein said salts contain an average of from 0.5 to 6.0 molecules of ammonia per molecule of zinc;
   b. ammoniated zinc salts of benzene sulfonic acid containing an average of 0.5 to 6.0 molecules of ammonia per molecule of zinc;
   c. ammoniated zinc salts of alkyl hydroxy sulfonic acids wherein the alkyl portion contains from 12 to 20 carbon atoms and wherein said salts contain an average of from 0.5 to 6.0 molecules of ammonia per molecule of zinc;
   d. ammoniated zinc salts of olefin sulfonic acids wherein said olefin portion contains from 12 to 20 carbon atoms and wherein said salts contain an average of from 0.5 to 6.0 molecules of ammonia per molecule of zinc;
   e. ammoniated zinc salts of alkyl sulfates wherein said alkyl portion contains from 10 to 16 carbon atoms and wherein said salts contain an average of from 0.5 to 6.0 molecules of ammonia per molecule of zinc;
   f. ammoniated zinc salts of diphenylalkane sulfonic acids wherein the alkyl portion contains a total of from 2 to about 16 carbon atoms and wherein said salts contain an average of from 0.5 to 6.0 molecules of ammonia per molecule of zinc; and
   g. combinations thereof;

from about 98.5 to about 20 weight percent water; and from about 1 to about 30 weight percent of an alcohol selected from the group consisting of alkanols containing from about 2 to about 4 carbon atoms, and dihydroxyalkanols containing from about 2 to about 4 carbon atoms.

2. The formulation of claim 1 wherein said formulation contains from about 1 to about 10 weight percent of a hydrotrope selected from the group consisting of sodium xylene sulfonate, potassium xylene sulfonate, ammonium xylene sulfonate, sodium toluene sulfonate, potassium toluene sulfonate, ammonium toluene sulfonate and combinations thereof.

* * * * *